United States Patent
Sudbrink et al.

(10) Patent No.: US 9,516,796 B2
(45) Date of Patent: Dec. 13, 2016

(54) AGRICULTURAL TILLAGE IMPLEMENT WHEEL CONTROL

(71) Applicant: CNH Industrial America LLC, New Holland, PA (US)

(72) Inventors: Matthew R. Sudbrink, Metamora, IL (US); Dean A. Knobloch, Tucson, AZ (US); James W. Henry, Saskatoon (CA); Eric J. Anderson, Metamora, IL (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 154 days.

(21) Appl. No.: 14/534,927

(22) Filed: Nov. 6, 2014

(65) Prior Publication Data

US 2015/0129254 A1    May 14, 2015

Related U.S. Application Data

(60) Provisional application No. 61/903,529, filed on Nov. 13, 2013.

(51) Int. Cl.
*A01B 63/111*    (2006.01)
*A01B 63/16*    (2006.01)
(Continued)

(52) U.S. Cl.
CPC ............... *A01B 3/26* (2013.01); *A01B 73/044* (2013.01); *A01B 73/046* (2013.01)

(58) Field of Classification Search
CPC ... A01B 63/006; A01B 63/008; A01B 63/026; A01B 63/10; A01B 63/111; A01B 63/118; A01B 63/16; A01B 73/02; A01B 73/04
(Continued)

(56) References Cited

U.S. PATENT DOCUMENTS 3,700,041 A    10/1972  Ryan
3,880,241 A *  4/1975  Vincent .................. A01B 23/04
                                                   16/231
(Continued)

FOREIGN PATENT DOCUMENTS

CA    2 289 240 A1    5/2000
FR    2 651 957 A1    3/1991
(Continued)

OTHER PUBLICATIONS

"Electro-hydraulic tillage depth control system for rotary implements mounted on agricultural tractor Design and response experiments of control system", Jeyong Lee, M. Yamazaki, A. Oida, H. Nakashima, H. Shimizu, Journal of Terramechanics 35, 1998, pp. 229-238 (10 pages).

*Primary Examiner* — Gary Hartmann
(74) *Attorney, Agent, or Firm* — Rebecca L. Henkel

(57) ABSTRACT

An agricultural tillage implement includes a main section including a hitch extending in a travel direction, a plurality of foldable wing sections coupled with the main section, a plurality of ground engaging tilling elements, a plurality of wheel assemblies and a control system. The tilling elements are coupled to the main section and wing sections. Each of the wheel assemblies include an actuator. The wheel assemblies include a first plurality of wheel assemblies associated with the main section and a second plurality of wheel assemblies associated with the plurality of wing sections. The actuators of the first plurality of wheel assemblies being independent of the actuators of the second plurality of wheel assemblies. The control system is configured to actuate the actuators to control a depth of tilling elements in each of the sections when the implement is in a field mode.

18 Claims, 10 Drawing Sheets

(51) Int. Cl.
*A01B 73/04* (2006.01)
*A01B 3/26* (2006.01)

(58) Field of Classification Search
USPC .................................. 172/4, 452, 669
See application file for complete search history.

(56) References Cited

U.S. PATENT DOCUMENTS

| | | | |
|---|---|---|---|
| 3,908,345 A | | 9/1975 | Oni et al. |
| 4,026,365 A | | 5/1977 | Andersson et al. |
| 4,119,329 A | | 10/1978 | Smith |
| 4,176,721 A | | 12/1979 | Poggemiller et al. |
| 4,273,196 A | | 6/1981 | Etsusaki et al. |
| 4,301,871 A | | 11/1981 | van der Lely et al. |
| 4,317,489 A | | 3/1982 | Steinbach |
| 4,324,296 A | * | 4/1982 | Schenk ............... A01B 73/044 172/311 |
| 4,355,688 A | | 10/1982 | Hamm et al. |
| 4,359,105 A | | 11/1982 | Van Natta |
| 4,425,971 A | * | 1/1984 | Allen ................... A01B 73/02 172/311 |
| 4,600,060 A | | 7/1986 | Winter et al. |
| 4,790,389 A | * | 12/1988 | Adee ..................... A01B 35/30 172/311 |
| 4,878,543 A | | 11/1989 | Kauss |
| 4,944,355 A | | 7/1990 | Karchewski |
| 5,009,270 A | | 4/1991 | Vangsgard |
| 5,156,216 A | * | 10/1992 | Van Mill ............... A01B 63/32 172/138 |
| 5,234,060 A | | 8/1993 | Carter |
| 5,261,495 A | * | 11/1993 | Szymczak ........... A01B 63/1117 172/2 |
| 5,427,184 A | | 6/1995 | Peck |
| 5,538,266 A | | 7/1996 | Martin et al. |
| 5,562,167 A | | 10/1996 | Honey |
| 5,573,072 A | | 11/1996 | Evans et al. |
| 5,590,721 A | * | 1/1997 | Van Mill .............. A01B 49/027 172/138 |
| 5,641,026 A | * | 6/1997 | Balmer ................. A01B 35/04 172/286 |
| 5,660,237 A | | 8/1997 | Boyko et al. |
| 5,771,978 A | | 6/1998 | Davidson et al. |
| 5,957,218 A | | 9/1999 | Noonan et al. |
| 6,035,943 A | * | 3/2000 | Gerein ................... A01B 63/22 172/328 |
| 6,089,327 A | | 7/2000 | Kimura et al. |
| 6,092,609 A | * | 7/2000 | Jeffery ................. A01B 73/046 172/311 |
| 6,112,145 A | | 8/2000 | Zachman |
| 6,112,827 A | | 9/2000 | Reiber et al. |
| 6,144,910 A | | 11/2000 | Scarlett et al. |
| 6,220,366 B1 | | 4/2001 | Noonan et al. |
| 6,305,478 B1 | | 10/2001 | Friggstad |
| 6,367,589 B1 | | 4/2002 | Lausch et al. |
| 6,374,921 B1 | | 4/2002 | Friggstad |
| 6,547,012 B2 | | 4/2003 | Scarlett et al. |
| 6,786,130 B2 | | 9/2004 | Steinlage et al. |
| 6,902,010 B2 | * | 6/2005 | Shoup ................. A01B 73/065 172/111 |
| 6,935,253 B2 | | 8/2005 | Murray et al. |
| 7,142,956 B2 | | 11/2006 | Heiniger et al. |
| 7,513,316 B2 | * | 4/2009 | Ruckle ................... A01B 63/22 172/482 |
| 7,588,088 B2 | | 9/2009 | Zachman |
| 7,766,093 B2 | | 8/2010 | Becker et al. |
| 7,970,519 B2 | | 6/2011 | Green |
| 8,215,413 B2 | * | 7/2012 | Friggstad ............. A01B 73/067 172/311 |
| 8,235,133 B2 | | 8/2012 | Friggstad |
| 8,352,121 B2 | | 1/2013 | Bitter |
| 8,359,988 B2 | | 1/2013 | Bassett |
| 8,776,908 B2 | * | 7/2014 | Maro ................... A01B 73/046 172/311 |
| 8,833,481 B2 | * | 9/2014 | Blunier ............... A01B 73/044 172/311 |
| 2004/0016556 A1 | | 1/2004 | Barber |
| 2006/0021235 A1 | | 2/2006 | Becker |
| 2007/0068238 A1 | | 3/2007 | Wendte |
| 2008/0267719 A1 | | 10/2008 | Corcoran |
| 2012/0048159 A1 | | 3/2012 | Adams et al. |
| 2012/0048160 A1 | | 3/2012 | Adams et al. |
| 2012/0215410 A1 | | 8/2012 | McClure et al. |
| 2012/0227992 A1 | | 9/2012 | Henry |
| 2012/0261146 A1 | | 10/2012 | Bolten |
| 2012/0305321 A1 | | 12/2012 | Wagger |
| 2013/0032363 A1 | | 2/2013 | Curry et al. |
| 2015/0129251 A1 | * | 5/2015 | Sudbrink ............. A01B 73/046 172/1 |
| 2015/0129252 A1 | * | 5/2015 | Sudbrink ............. A01B 73/046 172/1 |
| 2015/0129255 A1 | * | 5/2015 | Sudbrink ................ A01B 3/26 172/2 |
| 2016/0081261 A1 | * | 3/2016 | Paulessen .......... A01B 63/1145 172/195 |
| 2016/0205862 A1 | * | 7/2016 | Sudbrink ............... A01B 63/22 |
| 2016/0212927 A1 | * | 7/2016 | Sudbrink ............... A01B 63/32 |
| 2016/0212928 A1 | * | 7/2016 | Wileniec ............. A01B 73/046 |
| 2016/0212929 A1 | * | 7/2016 | Wileniec ............... A01B 63/22 |

FOREIGN PATENT DOCUMENTS

| | | |
|---|---|---|
| GB | 833670 | 4/1960 |
| JP | 3087102 A | 4/1991 |
| JP | 9313010 A | 12/1997 |
| JP | 2000-270603 A | 10/2000 |
| WO | 03/000028 A1 | 1/2003 |
| WO | 2013/026661 A1 | 2/2013 |

* cited by examiner

AGRICULTURAL TILLAGE IMPLEMENT WHEEL CONTROL

CROSS REFERENCE TO RELATED APPLICATIONS

This is a non-provisional application based upon U.S. provisional patent application Ser. No. 61/903,529, entitled "AGRICULTURAL TILLAGE IMPLEMENT WHEEL CONTROL", filed Nov. 13, 2013, which is incorporated herein by reference.

BACKGROUND OF THE INVENTION

1. Field of the Invention

The present invention relates to agricultural implements, and, more particularly, to agricultural tillage implements.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

Tillage equipment prepares the soil by way of mechanical agitation of various types, such as digging, stirring, and overturning. Examples of which include ploughing (overturning with moldboards or chiseling with chisel shanks), rototilling, rolling with cultipackers or other rollers, harrowing, and cultivating with cultivator shanks.

Tillage is often classified into two types, primary and secondary. There is no strict definition of these two types, perhaps a loose distinction between the two is that tillage that is deeper and more thorough is thought of as primary, and tillage that is shallower is thought of as secondary. Primary tillage such as plowing produces a larger subsurface difference and tends to produce a rough surface finish, whereas secondary tillage tends to produce a smoother surface finish, such as that required to make a good seedbed for many crops. Harrowing and rototilling often combine primary and secondary tillage into one operation.

Wheels are often integral with tillage implements and are used for both transportation of the implement, and for depth control of the tillage elements. The prior art includes control systems that raise and lower the implement as an entire unit, which can result in uneven tillage across the implement width of today's wider equipment.

What is needed in the art is an easy to use mechanism for depth control of an agricultural tillage implement.

SUMMARY OF THE INVENTION

The present invention provides a tillage implement that has several tilling sections with the ability to independently control the depth of the tilling elements of the various sections.

The invention in one form is directed to an agricultural tillage implement that includes a main section having a hitch extending in a travel direction, a plurality of foldable wing sections coupled with the main section, a plurality of ground engaging tilling elements, a plurality of wheel assemblies and a control system. The tilling elements are coupled to the main section and wing sections. Each of the wheel assemblies include an actuator. The wheel assemblies include a first plurality of wheel assemblies associated with the main section and a second plurality of wheel assemblies associated with the plurality of wing sections. The actuators of the first plurality of wheel assemblies being independent of the actuators of the second plurality of wheel assemblies. The control system is configured to actuate the actuators to control a depth of tilling elements in each of the sections when the implement is in a field mode.

The invention in another form is directed to a control system of an agricultural tillage implement. The implement has a main section including a pull hitch extending in a travel direction, a plurality of foldable wing sections coupled with the main section and a plurality of wheel assemblies, each of the sections having at least one tilling element that is engageable with the ground. The control system includes a controller and a plurality of actuators. At least one actuator is associated with each of the wheel assemblies. The plurality of wheel assemblies include a first plurality of wheel assemblies associated with the main section and a second plurality of wheel assemblies associated with the plurality of wing sections. The actuators of the first plurality of wheel assemblies are controlled independently of the actuators of the second plurality of wheel assemblies by the controller. The controller is configured to actuate the actuators to control a depth of the tilling elements in each of the sections while the implement is in a field mode.

The invention in yet another form is directed to a method of controlling profile heights of a plurality of sections of tilling assemblies of an agricultural implement. The method includes the step of independently actuating a plurality of actuators to control a depth of tilling elements in each of a plurality of foldable sections of the implement when the implement is in a field mode.

An advantage of the present invention is that the implement has a decreased profile in the transport mode.

Another advantage of the present invention is that the control system can be used to level the implement from side-to-side.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
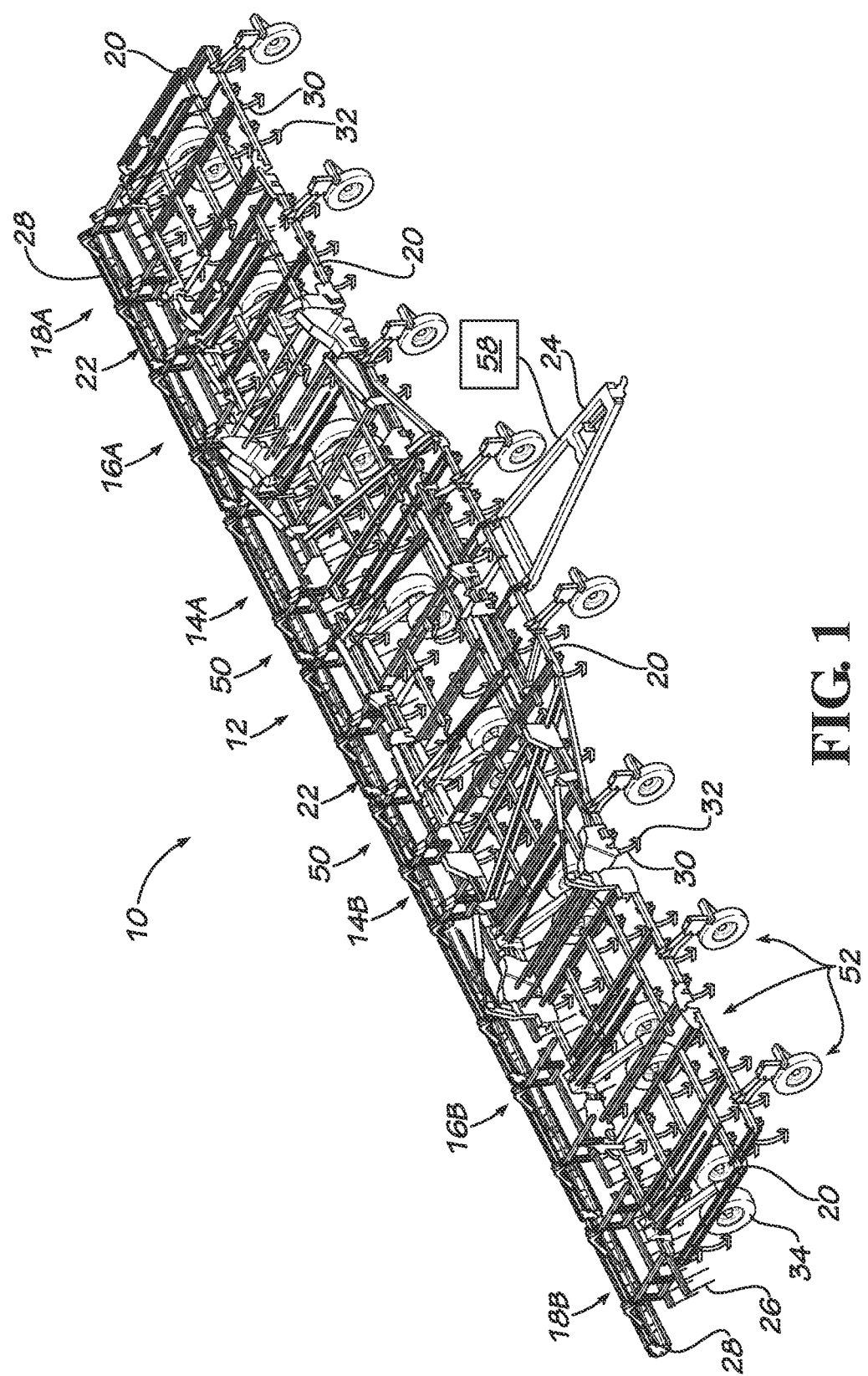
FIG. 1 is a top perspective view of an embodiment of an agricultural tillage implement of the present invention, in the form of a field cultivator, in an unfolded position.

Referring now to the drawings, and more particularly to FIG. 1, there is shown an embodiment of a tillage implement of the present invention. In the illustrated embodiment, the tillage implement is in the form of a field cultivator 10 for tilling and finishing soil prior to seeding.

Field cultivator 10 is configured as a multi-section field cultivator, and includes a center frame section 12, also referred herein as a main section 12, and a plurality of wing sections 14, 16 and 18. In the illustrated embodiment, field cultivator 10 has a triple-fold configuration with three left wings sections designated 14A, 16A and 18A, and three right wing sections designated 14B, 16B and 18B. Wing sections 14A and 14B are each inner wing sections, wing sections 16A and 16B are each middle wing sections, and wing sections 18A and 18B are each outer wing sections.

Center frame section 12 is the center section that is directly towed by a traction unit, such as an agricultural tractor (not shown). Center frame section 12 generally functions to carry a shank frame 20 for tilling the soil, and a rear auxiliary implement 22 for finishing the soil. A pull hitch 24 extends forward from shank frame 20, and is coupled with the traction unit in known manner.

Rear auxiliary implement 22 includes a spring tooth drag 26 and a rolling (aka, crumbler) basket 28 which coact with each other to finish the soil. However, rear auxiliary implement 22 can be differently configured, such as a spike tooth drag, cultivator shanks, etc.

Figure 2:
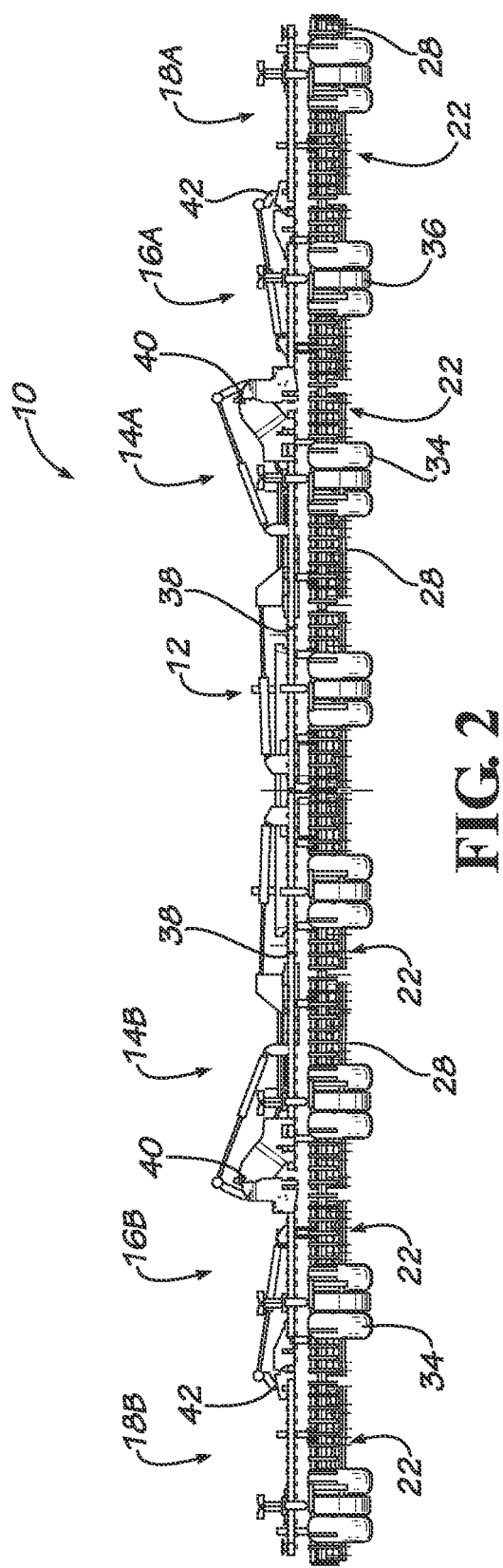
FIG. 2 is a front view of the field cultivator shown in FIG. 1.

Shank frame 20 generally functions to carry cultivator shanks 30 with shovels 32 at their lower ends for tilling the soil. Rear lift wheels 34 are used for raising and lowering the shank frame 20 with a hydraulic lift cylinder (not specifically visible in FIGS. 1 and 2), and a pair of front gauge wheels 36 are used to level the shank frame 20 during a field operation.

Similarly, each inner wing section 14A and 14B, middle wing section 16A and 16B, and outer wing section 18A and 18B includes a shank frame 20 for tilling the soil, a rear auxiliary implement 22 for finishing the soil, rear lift wheels 34 and front gauge wheels 36. These components are slightly different from but still similar to the like-named components described above with regard to center frame section 12, and are not described in further detail herein.

Figure 3:
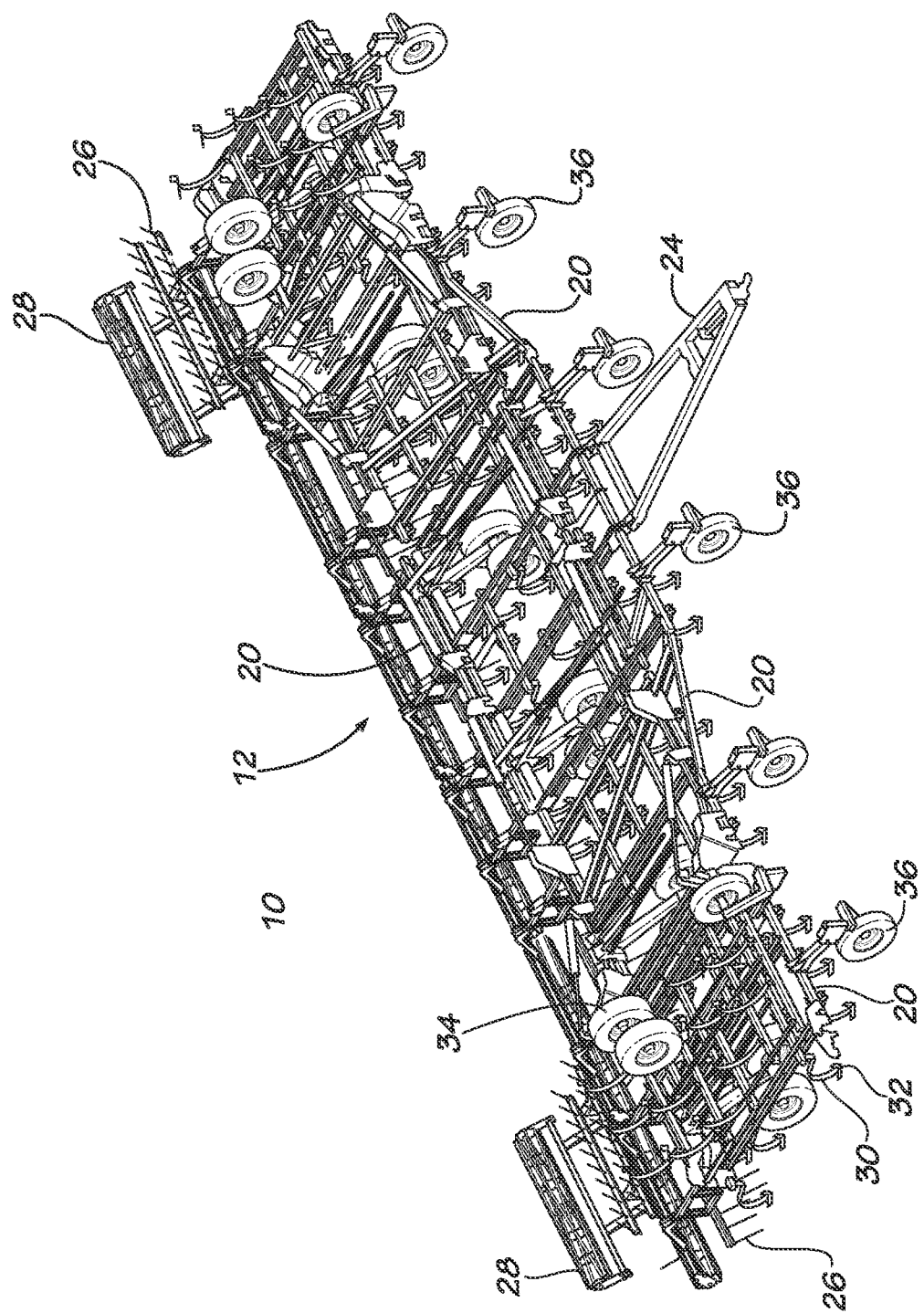
FIG. 3 is a top perspective view of the field cultivator shown in FIGS. 1-2, with the outer wing sections folded to a transport position.
Figure 4:
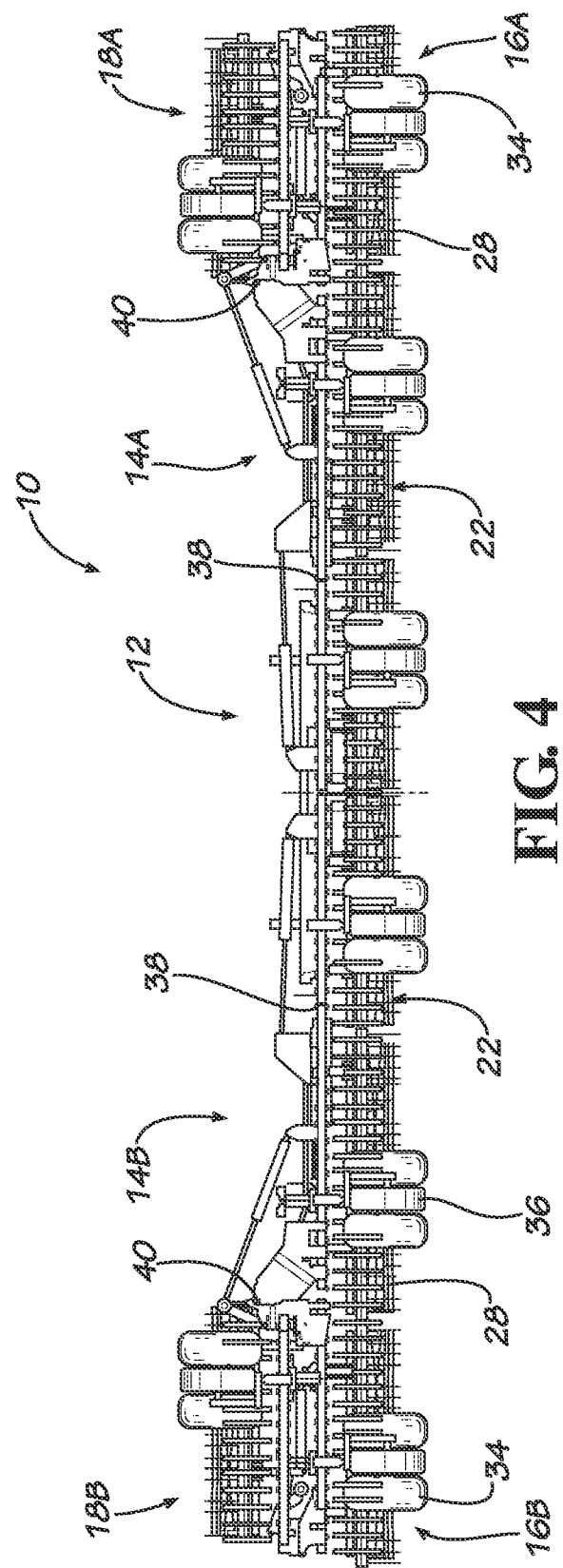
FIG. 4 is a front view of the field cultivator shown in FIG. 3, with the outer wing sections folded to the transport position.
Figure 5:
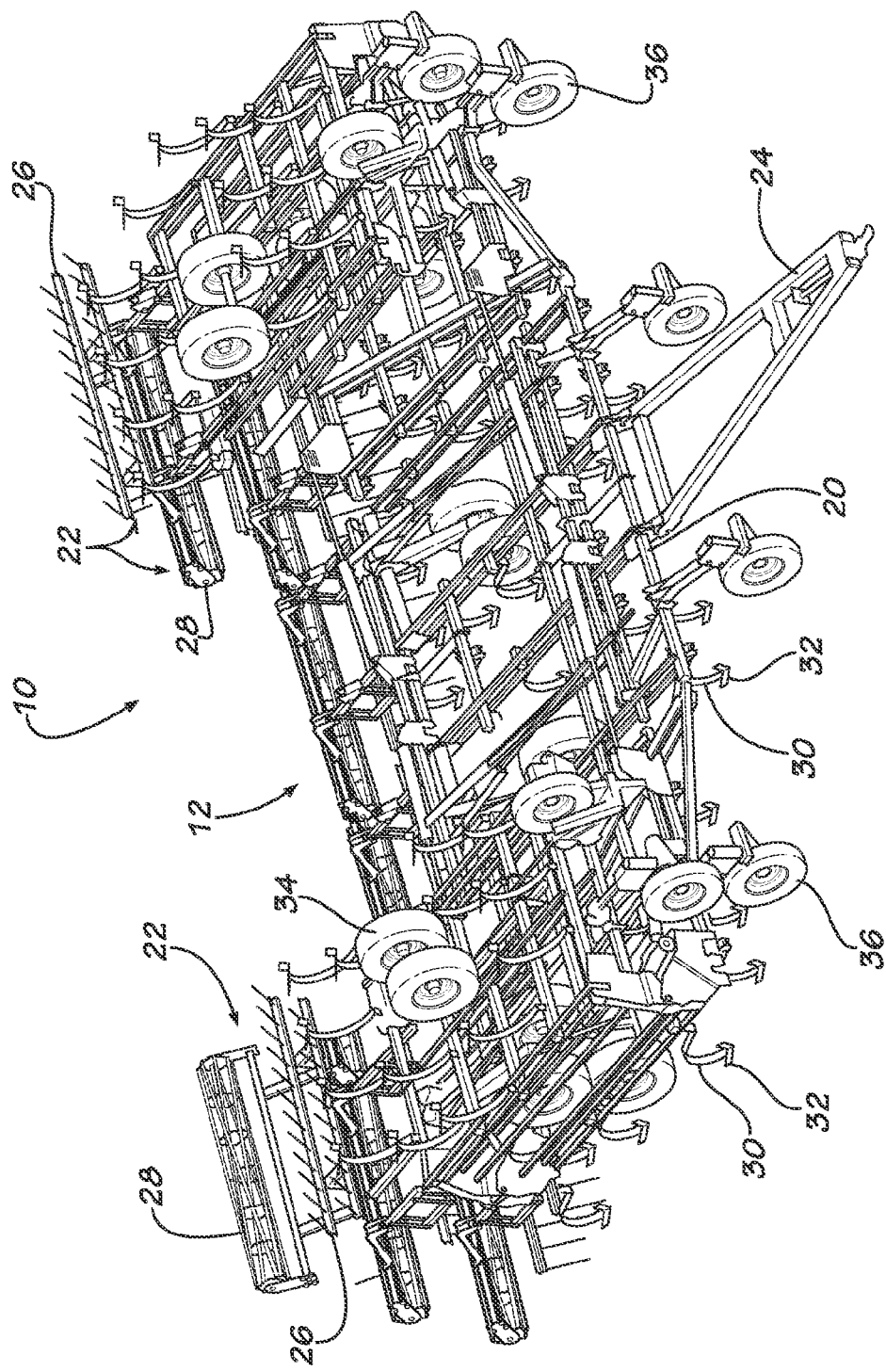
FIG. 5 is a top perspective view of the field cultivator shown in FIGS. 1-4, with the middle wing sections folded to a transport position.
Figure 6:
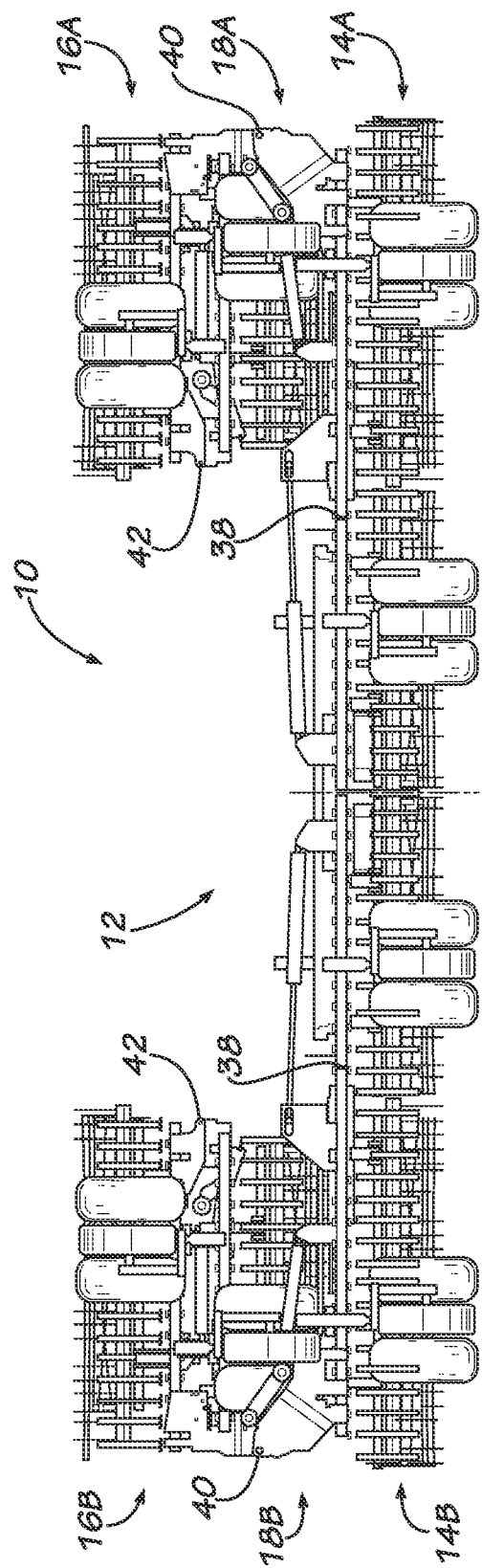
FIG. 6 is a front view of the field cultivator shown in FIG. 5, with the middle wing sections folded to the transport position.
Figure 7:
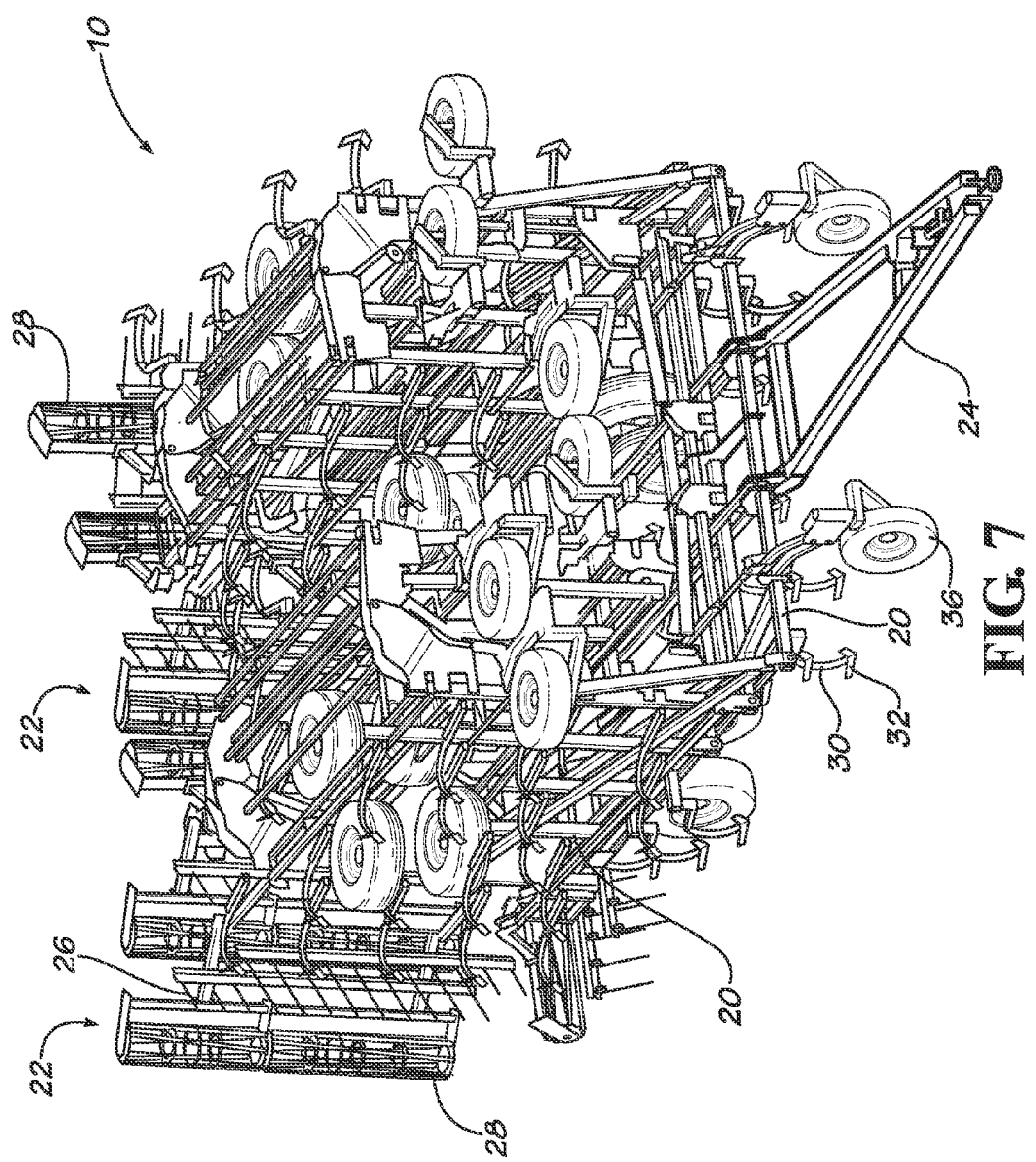
FIG. 7 is a top perspective view of the field cultivator shown in FIGS. 1-6, with the inner wing sections folded to a transport position.
Figure 8:
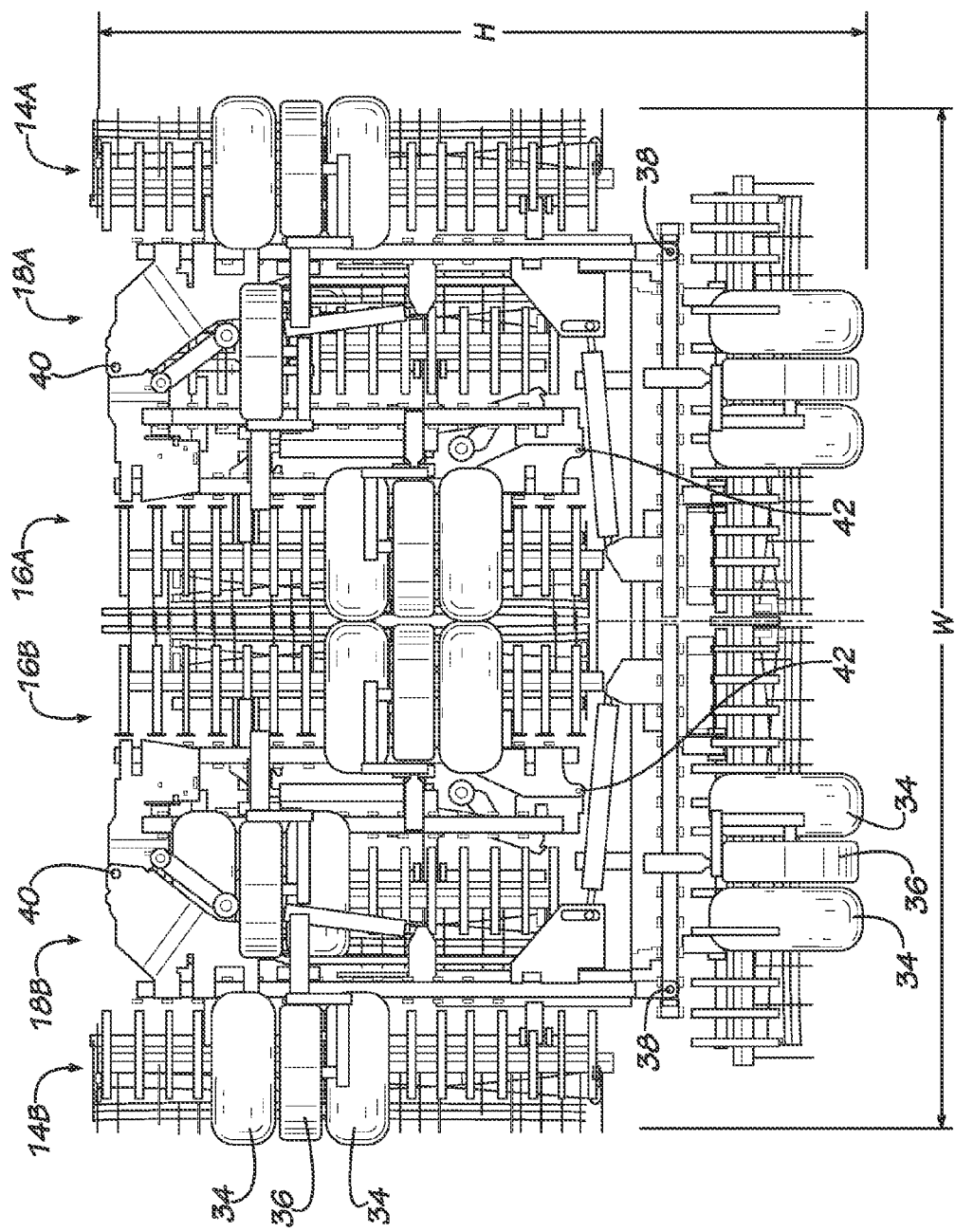
FIG. 8 is a front view of the field cultivator shown in FIG. 7, with the inner wing sections folded to the transport position.

During use, it is periodically necessary to move the field cultivator 10 from an unfolded (operating) position to a folded (transport) position. First, each outer wing section 18A and 18B is folded laterally inward and over a respective middle wing section 16A and 16B (FIGS. 3 and 4). With the outer wing sections 18A and 18B in the folded state, each middle wing section 16A and 16B is then folded laterally inward and over a respective inner wing section 14A and 14B (FIGS. 5 and 6). With the middle wing sections 16A and 16B in the folded state, each middle wing section 16A and 16B is then folded laterally inward and over the center frame section 12 (FIGS. 7 and 8). To unfold the field cultivator 10 and transform back to the field or operating position shown in FIGS. 1 and 2, the folding sequence described above is simply reversed.

The outer wing sections 18, middle wing sections 16 and inner wing sections 14 are stacked together in a vertically arranged stack over the center frame section 12 when in the folded state. To allow this type of nested stacking configuration, each of the wing sections 14, 16 and 18 have a pivot axis 38, 40 and 42, respectively, which is vertically offset to allow the wing sections to lie flat against the laterally inward shank frame 20/frame section 12 when in the folded state. The middle wing sections 16 have a pivot axis 40 that is vertically higher than pivot axes 38 and 42 of adjacent wing sections 14 and 18, when in the unfolded state.

Different countries and states have different regulatory highway requirements concerning oversized vehicles on the road. In the US, some states exempt agricultural equipment from such regulations, while others require that any type of vehicle on a road must comply with the oversized vehicle regulations. In Europe, the regulations may be more strict concerning the height and width of vehicles which may travel on a road without being accompanied by an escort vehicle. With the triple-fold field cultivator 10 of the present invention, the overall frontal profile dimensions when in the folded state fit within regulatory requirements for both the US and Europe. More particularly, with all of the wing sections 14, 16 and 18 in the folded state, the field cultivator 10 is then in a transport position with an overall frontal profile having dimensions with a maximum width "W" of no greater than approximately 20 feet, preferably approximately 18 feet wide, and a height "H" of no greater than approximately 14 feet, preferably approximately 13 feet, 6 inches high (FIG. 8).

These maximum frontal profile dimensions include all of the shank frames 20, shanks 30, rear lift wheels 34 and front gauge wheels 36, when in the folded state. The rear auxiliary implements 22 are considered to be add-ons to the main field cultivator 10, and may be outside these overall frontal profile dimensions, at least if not folded upwardly for the transport position. However, it is the intention that all of field cultivator 10, including the rear auxiliary implements 22, be within these maximum frontal profile dimensions when in the transport position.

Figure 9:
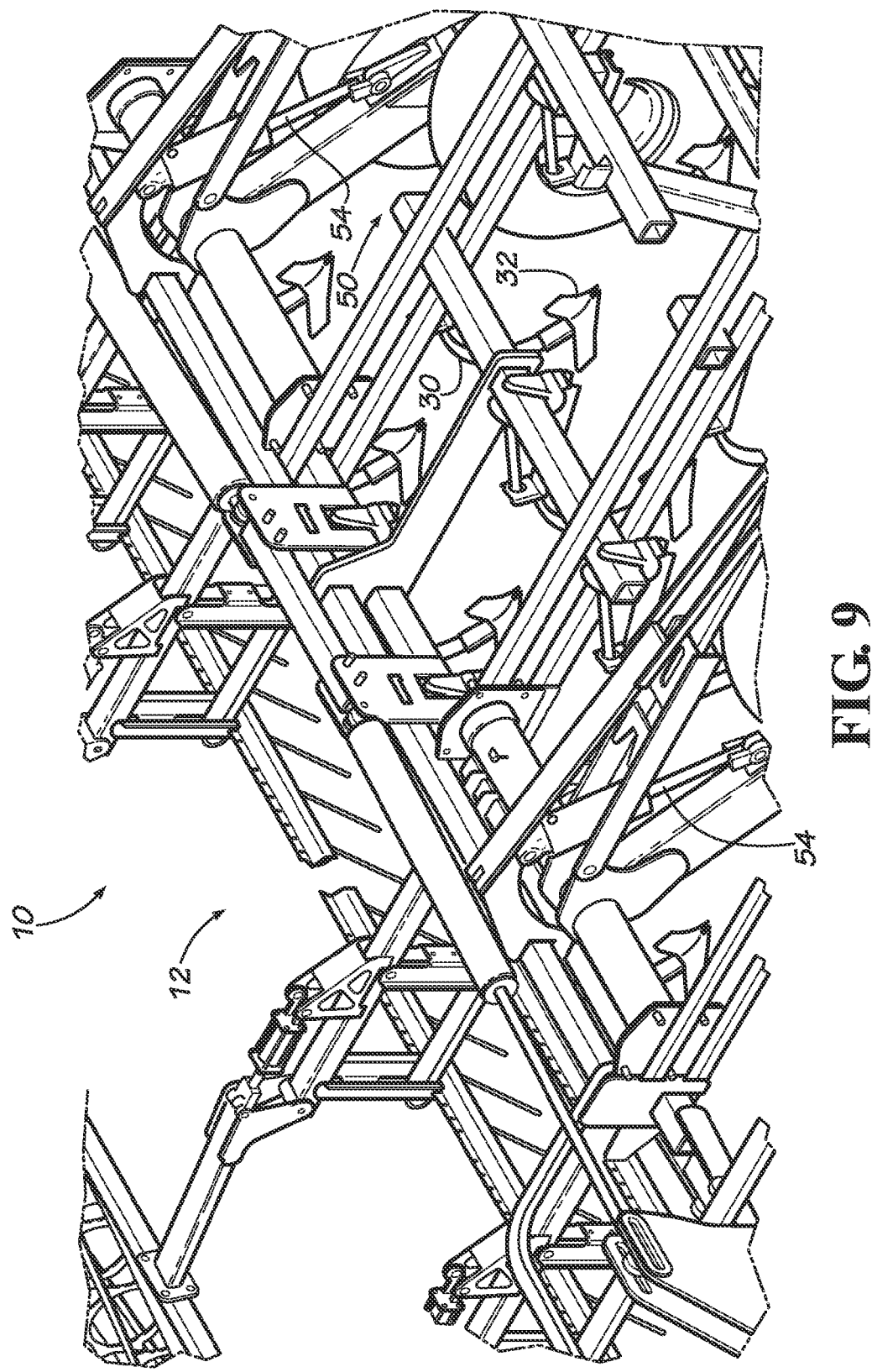
FIG. 9 is a perspective view of part of the main frame section of the field cultivator of FIGS. 1-8.
Figure 10:
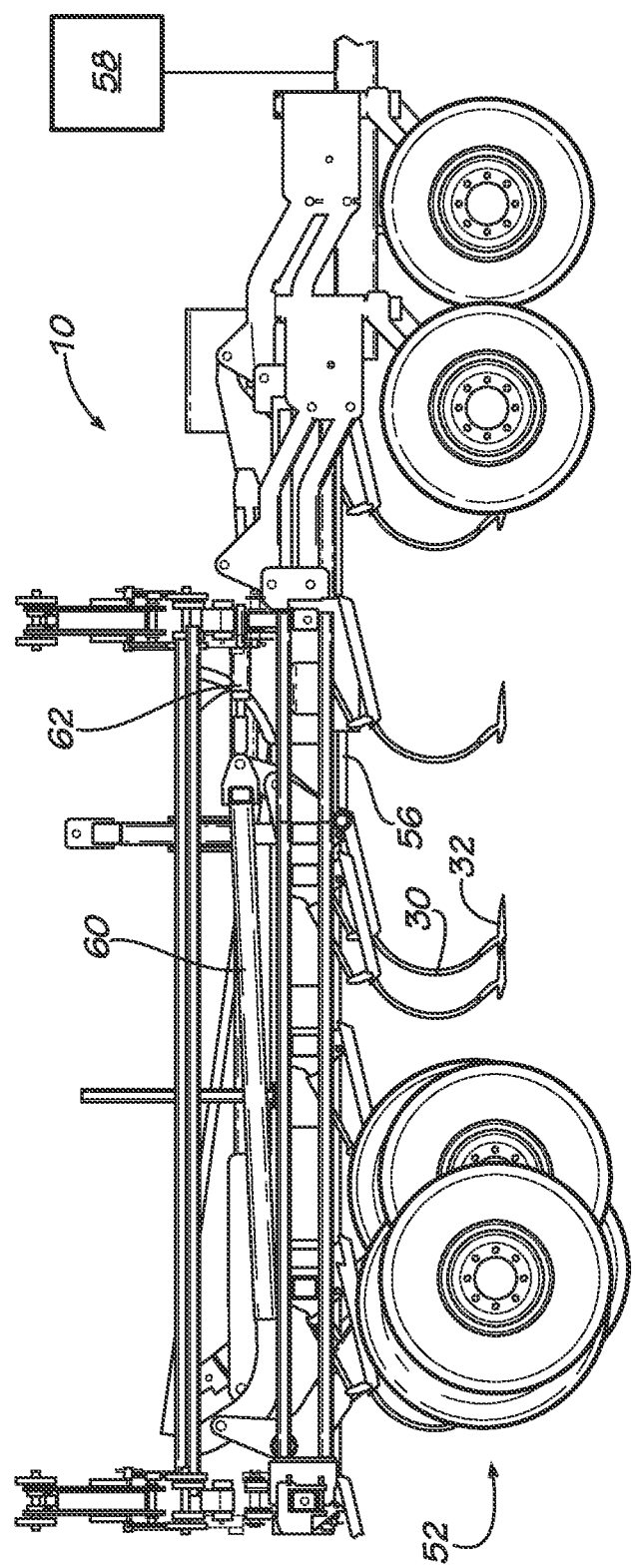
FIG. 10 is a side view of the field cultivator of FIGS. 1-9, with a primary focus on a wing section.

Now, additionally referring to FIGS. 9 and 10 there is shown further details of implement 10. Main section 12 is shown in FIG. 9 with wheel assemblies 50 having actuators 54, which provide depth level control for main section 12 when implement 10 is in field mode and support for the folded implement 10 while in transport mode.

A typical wheel assembly 52 is shown for one of the wing sections 14, 16 and 18 in FIG. 10. Wheel assemblies 52 include actuators 56, a linkage system 60 and an adjustable link 62. A controller 58 (shown abstractly in the figures) orchestrates the movement of wheel assemblies 50 and 52 in field and transport modes and during the transition to/from the field and transport modes.

Wheel assemblies 50 are shown having actuator 54 coupled more directly to the rear wheels and a linkage system is used to move the wheels that are to the fore of the rear wheels. Wheel assemblies 52 have actuator 56 positioned between the rear and fore wheels with linkage system 60 coupling both the rear and fore wheels for coordinated movement. Adjustable link 62 allows for an independent manual fore/aft leveling adjustment of each section.

Actuators 54 and 56, are under the independent and individual control of controller 58 so that sections 12-18 can each be individually adjusted for depth control of shovels 32 (which are tillage elements) of each section in a manner substantially independent of the other sections while in the field mode of operation. As implement 10 is transitioned from the field mode to the transport mode and the sections are being folded together, controller 58 causes wheel assemblies 52 to go from the fully extended position, as shown in FIG. 10 with actuator 56 fully extended, to being partially retracted as seen in the folded wing sections of FIG. 6. This effectively lowers the profile of each wing section 14-18 as the particular wing section is folded. While controller 58 may be a set of valves manually controlled by an operator, it is contemplated that controller 58 would be an electronic control system that controls the sequence of lowering the profile of each wing section, as it is being folded by the actuators used for the purpose of folding wing sections 14-18.

The present invention advantageously independently controls the depth of the tilling elements while implement 10 is in the field mode. The prior art used a common rocker shaft between lift wheels on the main frame, which is not as flexible as the present invention. The present invention uses the depth control mechanism to also minimize the height profile of each section as wing sections 14-18 are folded for transport and the process is reversed when implement 10 transitions from the transport mode to the field mode.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
    a main section including a pull hitch extending in a travel direction;
    a plurality of foldable wing sections coupled with said main section;
    a plurality of ground engaging tilling elements individually coupled to one of said main section and to said plurality of foldable wing sections;
    a plurality of wheel assemblies, each said wheel assembly including an actuator, said plurality of wheel assemblies including a first plurality of wheel assemblies associated with said main section and a second plurality of wheel assemblies associated with said plurality of wing sections, said actuators of said first plurality of wheel assemblies being independent of said actuators of said second plurality of wheel assemblies; and
    a control system configured to actuate said actuators to control a depth of said tilling elements in each of said sections when the implement is in a field mode.

2. The agricultural tillage implement of claim 1, wherein said control system is additionally configured to actuate said actuators to effect a profile minimizing operation of said foldable wing sections when the implement is being put into a transport mode.

3. The agricultural tillage implement of claim 1, wherein each of said actuators are independently extendable and retractable.

4. The agricultural tillage implement of claim 3, wherein said actuators are positionable to thereby substantially level the implement from side-to-side when the implement is in the field mode.

5. The agricultural tillage implement of claim 4, wherein said plurality of foldable wing sections include a plurality of foldable wing sections on each side of said main section, including an outer wing section furthest from said main section when in the field mode and an inner wing section closest to said main section when in the field mode.

6. The agricultural tillage implement of claim 5, wherein said outer wing section is configured to fold to be generally perpendicular to said main section and to be generally parallel to said inner wing section when the implement is in the transport mode.

7. The agricultural tillage implement of claim 6, wherein said actuators of said second plurality of wheel assemblies are configured to lower a profile of said wing sections as said wing sections are moved from said field mode to said transport mode.

8. The agricultural tillage implement of claim 6, wherein said actuators of said second plurality of wheel assemblies sections are configured to extend said wheel assemblies associated with said wing sections as said wing sections are moved from the transport mode to the field mode.

9. The agricultural tillage implement of claim 6, wherein said plurality of wheel assemblies each further include an adjustable link configured to level the implement in a fore/aft direction.

10. A control system of an agricultural tillage implement, the implement having a main section including a pull hitch extending in a travel direction, a plurality of foldable wing sections coupled with the main section and a plurality of wheel assemblies, each of the sections having at least one tilling element that is engageable with the ground, the control system comprising:
    a controller; and
    a plurality of actuators with at least one actuator being associated with each of said plurality of wheel assemblies, said plurality of wheel assemblies including a first plurality of wheel assemblies associated with said main section and a second plurality of wheel assemblies associated with said plurality of wing sections, said actuators of said first plurality of wheel assemblies being controlled independently of said actuators of said second plurality of wheel assemblies by said controller, said controller being configured to actuate said actuators to control a depth of the tilling elements in each of said sections while the implement is in a field mode.

11. The control system of claim 10, wherein said controller is additionally configured to actuate said actuators to effect a profile minimizing operation of said foldable wing sections when the implement is being put into a transport mode.

12. The control system of claim 10, wherein each of said actuators are independently extendable and retractable.

13. The control system of claim 12, wherein said actuators are positionable by said controller to thereby substantially level the implement from side-to-side when the implement is in the field mode.

14. The control system of claim 13, wherein said plurality of foldable wing sections include a plurality of foldable wing sections on each side of said main section, including an outer wing section furthest from said main section when in the field mode and an inner wing section closest to said main section when in the field mode.

15. The control system of claim 14, wherein said outer wing section is configured to fold to be generally perpendicular to said main section and to be generally parallel to said inner wing section when the implement is in a transport mode.

16. The control system of claim 15, wherein said actuators of said wing sections are configured to lower a profile of said wing sections as said wing sections are moved from said field mode to said transport mode.

17. The control system of claim 15, wherein said actuators of said wing sections are configured to extend said wheel assemblies associated with said wing sections as said wing sections are moved from said transport mode to said field mode.

18. The control system of claim 15, wherein said plurality of wheel assemblies each further include an adjustable link configured to level the implement in a fore/aft direction.

\* \* \* \* \*